United States Patent [19]
Devrick et al.

[11] 3,971,294
[45] July 27, 1976

[54] APPARATUS FOR CUTTING A MEMBER AND SEAL MEANS FOR ASSOCIATION WITH SUCH MEMBER

[75] Inventors: Charles E. Devrick, Lakeland; Nicholas J. Houmis, Tampa; Russell A. Johnson, Brandon, all of Fla.

[73] Assignee: Fibreboard Corporation, San Francisco, Calif.

[22] Filed: Feb. 11, 1974

[21] Appl. No.: 441,060

[52] U.S. Cl. ................................ 90/20; 82/DIG. 2; 90/11 R; 90/16
[51] Int. Cl.² ........................................ B23C 1/14
[58] Field of Search .................. 90/11 R, 15, 20, 16; 82/DIG. 2

[56] References Cited
UNITED STATES PATENTS

| | | | |
|---|---|---|---|
| 271,380 | 1/1883 | Tucker | 90/20 |
| 1,316,717 | 9/1919 | Hall | 93/20 |
| 1,426,168 | 8/1922 | Klick | 90/20 X |
| 2,266,306 | 12/1941 | Calame | 93/20 |
| 3,322,037 | 5/1967 | Cavagnero | 90/11 |
| 3,554,081 | 1/1971 | Haley | 90/20 |

FOREIGN PATENTS OR APPLICATIONS

| | | | |
|---|---|---|---|
| 941,535 | 11/1963 | United Kingdom | 90/20 |

*Primary Examiner*—Leon Gilden
*Attorney, Agent, or Firm*—Phillips, Moore, Weissenberger, Lempio & Strabala

[57] ABSTRACT

Apparatus for cutting an annular groove about a rotating cylindrical member includes a rotating cutter positioned in cutting relation to the outer surface of the cylindrical member and including a plurality of cutting edges, each forwardly angled in relation to the direction of rotation of the cutter. The cylindrical member and cutter rotate in the same direction so that an annular groove or channel is cut in and along the outer surface of the cylindrical member. Sealing apparatus is included for providing sealing between the outer surface of such member and the inner surface of a member overlying such first-mentioned member. The sealing apparatus is of resilient material and is seated in the channel. The sealing apparatus includes a pair of elongated ribs angled in the same direction, and in contact with each other when in such sealing situation, with the elongated side surface of one of such ribs in sealing contact with the inner surface of such overlying member.

2 Claims, 7 Drawing Figures

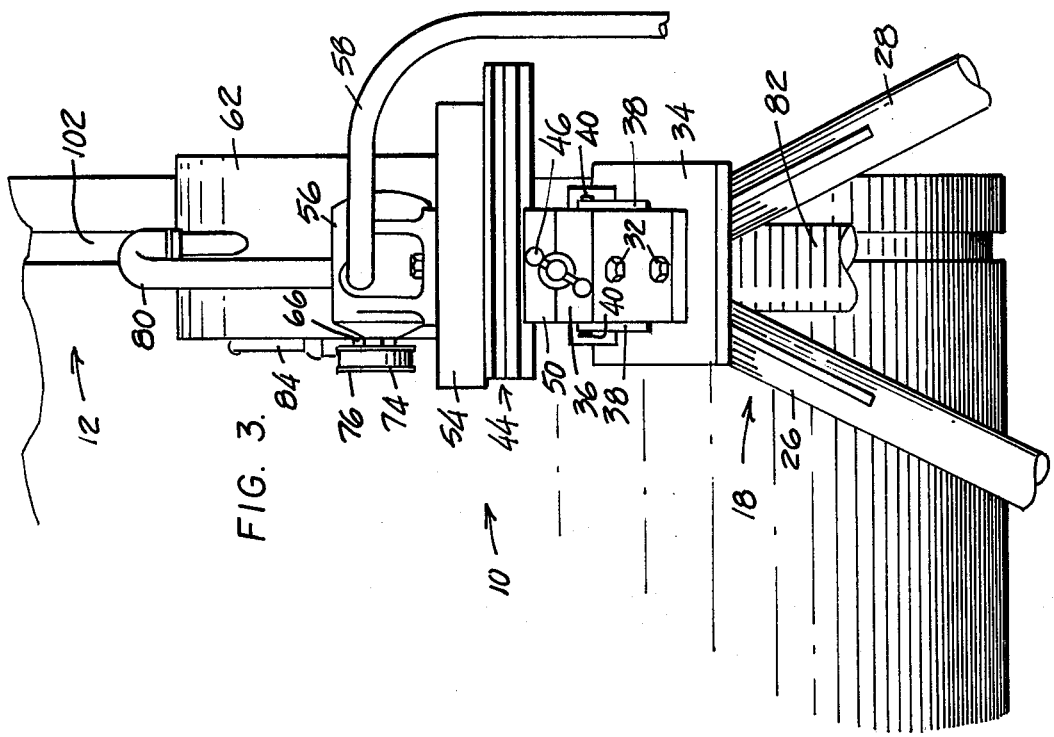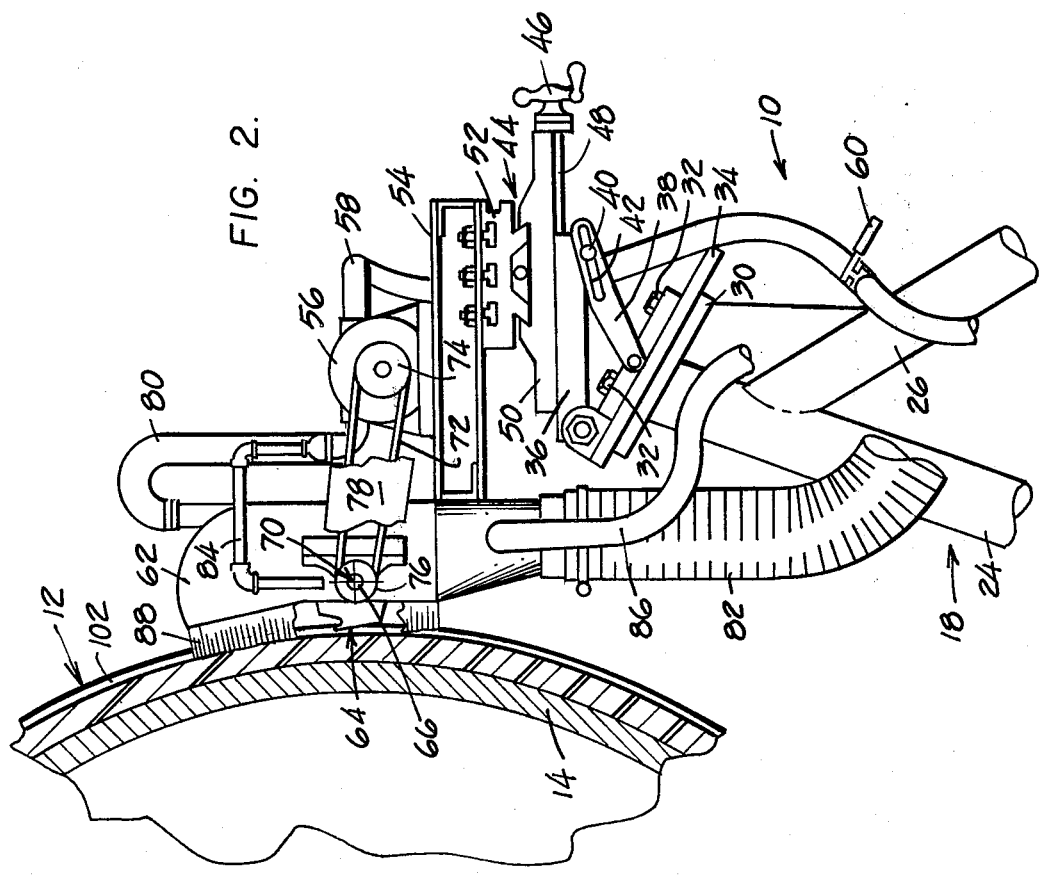

APPARATUS FOR CUTTING A MEMBER AND SEAL MEANS FOR ASSOCIATION WITH SUCH MEMBER

BACKGROUND OF THE INVENTION

This invention relates to method and apparatus for cutting a member, and more particularly, to such a method and apparatus for cutting an annular groove or channel in the outer surface of a cylindrical member, and about such cylindrical member. This invention further relates to sealing means for association with such channel formed in the member.

In providing sealing relation between the associated ends of large cylindrical tubes or pipes which carry pressurized fluid therewithin, it is well known to provide an end connection of adjoining pipes wherein the inner surface of a portion of one pipe overlies the outer surface of a portion of the pipe connected thereto. A sealing member or gasket is associated with adjacent outer and inner surfaces of these pipes in an attempt to provide sealing relation therebetween. For stable placement of such a sealing member, an annular groove is normally provided in the outer surface of such inner pipe end, and the sealing apparatus seats therein and extends therefrom into contact with the inner surface of the overlying portion.

It has been found that, for proper sealing to be achieved, dimensional control of the depth and configuration of the groove in relation to the outer surface of the tube on which such groove is formed is extremely critical when used in combination with a conventional O-ring gasket. Such problem of maintaining close dimensional tolerance is further complicated by the above-mentioned fact that the tubular members involved are of large overall size.

Additionally, it is to be understood that while an extremely high dimensional control is often desirable, variations in the design of the sealing means itself (i.e., as compared to a simple O-ring gasket) can with advantage lessen the dimensional control necessary, as compared with that necessary with the use of such an O-ring gasket.

SUMMARY OF THE INVENTION

It is accordingly an object of this invention to provide method and apparatus for forming an annular channel or groove in the outer surface of a cylindrical member, which method and apparatus are capable of being practiced and used to achieve proper dimensional control in the formation of such groove.

It is a still further object of this inventin to provide method and apparatus which, while fulfilling invention above object, are extremely efficient in use.

It is a still further object of this invention to provide sealing means for association with such annular groove and the inner surface of a tubular member disposed therearound, which lessens the degree of proper dimensional control necessary for proper sealing therebetween, when compared to a conventional O-ring type seal.

Broadly stated, the invention comprises apparatus for forming a groove in and along the outer surface of a member rotatable about an axis, comprising base means, and rotatable cutter means supported relative to the base means, and positionable upon positioning of the base means to engage the outer surface of the member, so that upon rotation of said cutter means, said cutter means are in cutting engagement with the outer surface of the member. Further included are means for rotating the cutter means to cut the outer surface of the member, so that upon the rotation of the member about the axis, the groove is cut therein and along the outer surface thereof. Broadly stated, the invention further comprises a method of forming an annular groove in and along the outer surface of a substantially cylindrical member. Such method comprises the steps of rotating the cylindrical member generally about the cylindrical axis thereof, positioning a rotatable cutter near the surface of the cylindrical member for engagement therewith, and rotating the rotatable cutter to cut the outer surface of the cylindrical member, the rotating cutter forming the annular groove upon the rotation of the cylindrical member generally about its cylindrical axis. The cutter is rotatable about an axis, and comprises a plurality of cutting edges, each forwardly angled in relation to the direction in which the cutter is rotatable. Also broadly stated, in accordance with the present invention, a sealing apparatus comprises an elongated resilient body, and first and second elongated resilient ribs extending from the body and disposed therealong, one of the first and second ribs being angled so as to overlie a portion of the body in spaced relation thereto.

BRIEF DESCRIPTION OF THE DRAWINGS

These and other objects of the invention will become apparent from a study of the following specification and drawings, in which:

FIG. 2 is an enlarged view of the area II—II of FIG. 1;

FIG. 3 is a front elevation of that area of the apparatus as shown in FIG. 2;

DESCRIPTION OF THE PREFERRED EMBODIMENT

Figure 1:
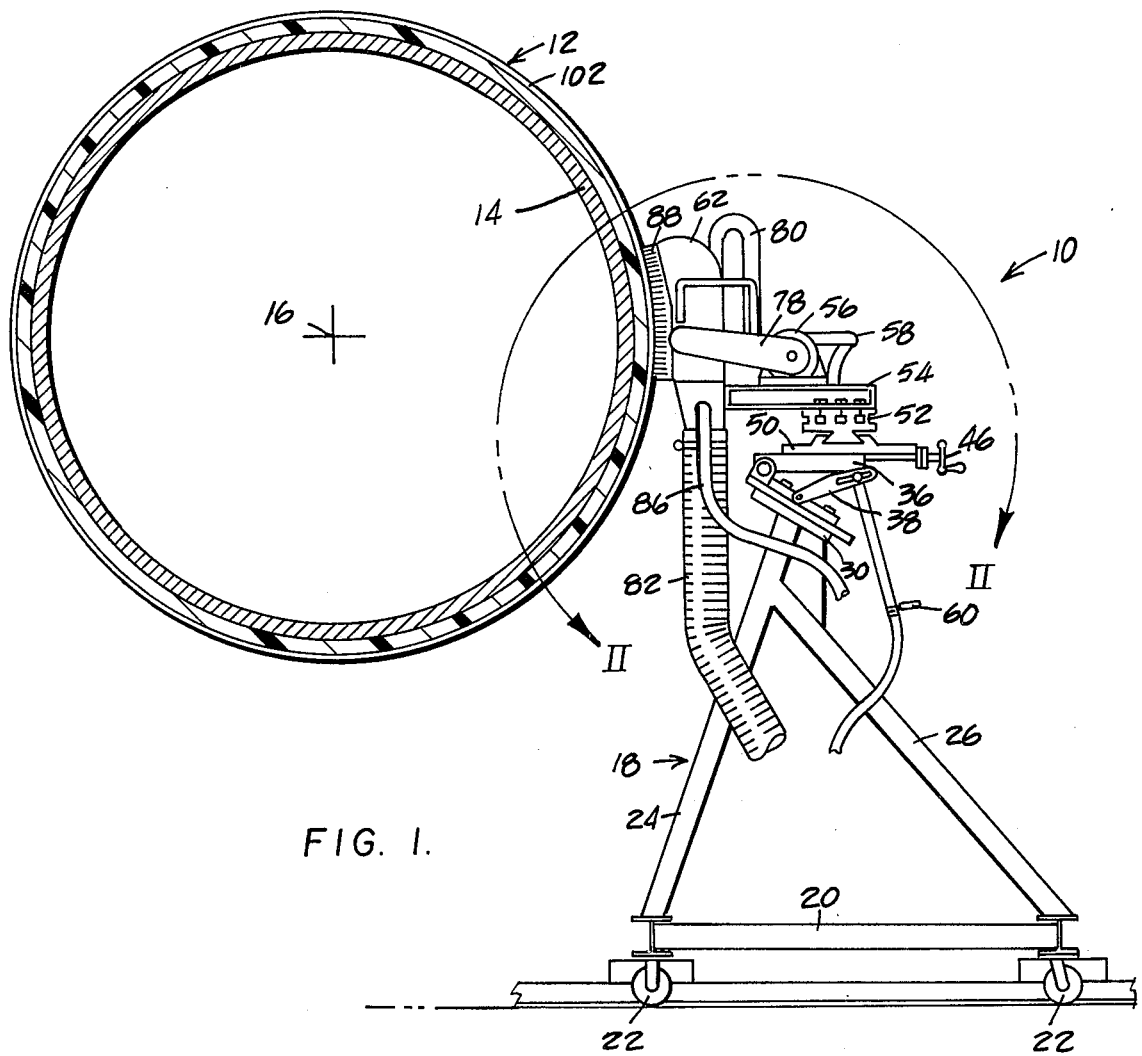
FIG. 1 is a side elevation of the apparatus, in association with a cylindrical member.

Shown generally in FIG. 1 is apparatus 10, in accordance with the present invention, for forming or cutting a groove in and along the outer surface of a cylindrical member 12. The apparatus 10 is used in conjunction with a filament winding machine which fabricates the cylindrical member 12 (in the form of a pipe or tube) on a rotating cylindrical mandrel 14. Through rotation of such mandrel 14 about the axis 16 as shown, the cylindrical member 12 formed thereon is rotated about its cylindrical axis, also axis 16.

As best shown in FIGS. 1–3, the apparatus 10 includes base means 18 including a lower portion 20 to which wheels 22 are secured, and tripod legs 24,26,28 extending upwardly and inwardly from the lower portion 20 and joined adjacent the top portions thereof. Leg 24 extends beyond legs 26,28 upwardly thereof, and has fixed thereto an angled plate 30. In turn fixed to the angled plate 30 by means of bolts 32 is a plate assembly 34. Hingedly fixed to the plate assembly 34 is a pivot plate 36. Links 38 are pivotally fixed to the plate assembly 34 also, on either side of the pivot plate 36, and bolts 40 are disposed through slots 42 defined by such links 38, and threadably engaged with the pivot plate 36. Loosening of the bolts 40 allows pivot plate 36 to be positioned upwardly and downwardly relative to the plate assembly 34 (and base means 18), and tightening of such bolts 40 fixes such pivot plate 36 in a chosen attitude or position relative to the base means 18. A milling table 44 is connected to the pivot plate 36, and may be selectively moved forwardly and rearwardly thereof by means of rotation of a handle 46 which rotates a threaded rod 48 rotatably supported relative to the pivot plate 36 and threadably enaged with a threaded member associated with the milling table 44, as is well known. The milling table 44 includes a lower portion 50, and an upper portion 52 movable relative thereto and laterally of the movement resulting from turning of handle 46.

The upper portion 52 of the milling table 44 has fixed thereto a support table 54 on which is mounted an air motor 56. Such air motor 56 is driven by means of a supply of flowing air provided thereto through a supply hose 58 upon the opening of a valve 60, the air flow in turn being supplied thereto by well known means. A guard 62 is fixed to the support table 54 and generally surrounds a cutter 64, rotatably supported on a shaft 66 which is in turn supported by bearings on either side of the cutter 64 and supported by the side plates of the guard 62. The cutter 64 is rotatable about an axis 70 defined by the shaft 66, and is rotated by means of a drive belt 72 interconnecting respective pulleys 74,76 associated with the motor 56 and shaft 66. A belt guard 78 is secured to the cutter guard 62 for protecting the operator from the pulleys 74,76 and belt 72.

The flow of air exhausted from the air motor 56 (having been used in driving such motor 56) is directed by a hose 80, connected to the motor 56, to within the cutter guard 62 and adjacent the cutter 64, and is allowed to be exhausted from adjacent the cutter 64 through a large hose 82 connected to the inside of the cutter guard 62. A portion of the air flowing from the motor 56 flows into a lateral pipe 84, and to adjacent the bearings rotatably supporting the cutter 64, for cooling thereof. An auxiliary hose 86 supplies flowing air into the cutter guard 62 at a point below the cutter 64 for purposes to be hereinafter described. Brushes 88 are fixed to the cutter guard 62 on either side of cutter 64.

Figure 4:
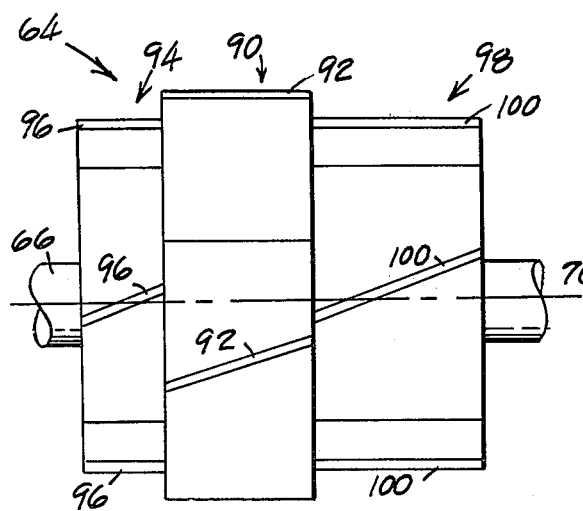
FIG. 4 is a front elevation of the cutter of the apparatus.
Figure 5:
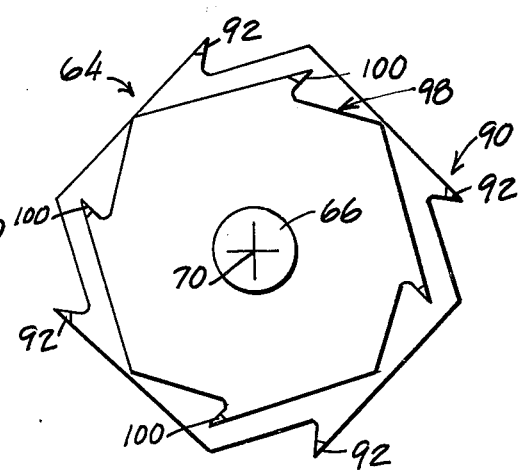
FIG. 5 is a side elevation of the cutter of the apparatus.

The cutter 64, as shown in FIGS. 4 and 5, includes a first or central plurality of blades 90, each defining a tungsten-carbide cutting edge 92 forwardly angled in relation to the direction in which the cutter 64 is rotatable. Each cutting edge 92, it will be seen, extends substantially the same distance from the axis 70 about which the cutter 64 is rotatable, and is angled relative to such axis 70 about which the cutter 64 is rotatable, in a skewed relation relative to such axis 70.

A second plurality of blades 94, each defining a tungsten-carbide cutting edge 96, is fixed to the first plurality of blades 90 and is disposed on one side thereof along the axis 70. Each of the second plurality of cutting edges 96 is also angled forwardly in relation to the direction in which the cutter 64 is rotatable, and each is angled relative to the axis about which the cutter 64 is rotatable, in a skewed relation relative to such axis 70. Each of the plurality of cutting edges 96 extends substantially the same distance from the axis 70. A third plurality of blades 98, each defining a tungsten-carbide cutting edge 100, is fixed to the plurality of blades 90, on the other side of the blades 90, opposite the plurality of blades 94, along the axis 70. Each of such cutting edges 100 is angled forwardly in relation to the direction in which the cutter 64 is rotatable, and is angled relative to the axis 70 about which the cutter 64 is rotatable, in a skewed relation relative to such axis 70. Each of the plurality of cutting edges 100 extends substantially the same distance from the axis 70, but, as will be seen, each of the plurality of cutting edges 92 extends beyond each of the cutting edges 96 and the cutting edges 100 as measured from said axis 70.

In the use of the apparatus 10, the base means 18 are positioned by means of wheels 22 so that the cutter 64 is positioned close to engagement with the outer surface of the cylindrical member 12. The mandrel 14 is rotated to rotate the cylindrical member 12 around the cylindrical axis 16. The bolts 40 are loosened to allow upward or downward pivoting of the pivot plate 36, and tightened upon proper positioning thereof. The upper portion 52 of the milling table 44 is moved laterally, moving the cutter 64 relative to the base means 18 and the cylindrical member 12 generally along the cylindrical axis 16. The cutter 64 is rotated by means of opening of the valve 60 to supply air flow to the motor 56, rotating the cutter 64 through the belt 72. Turning of handle 46 in one and the other directions results in movement of the cutter 64 toward and away from the axis 16 of the cylindrical member 12 in accordance with the description above. Consequently, rotation of the handle 46 in one direction moves the cutter 64 into position to engage the outer surface of the cylindrical member 12, and to cut into it. Upon such rotation of the cutter 64 and cylindrical member 12 as described above, an annular channel or groove 102 is formed in, along and about the outer surface of the cylindrical member 12 by the cutting edges 92. The cylindrical member 12 and cutter 64 are with advantage rotated in the same direction for most efficient cutting, so that the surface of the cylindrical member 12 to be cut travels in a direction opposite that of the edges 92 which are cutting.

The handle 46 is turned so that the cutting edges 92 cut a deeper and deeper groove 102, as desired, the cutting edges 96,100 on either side thereof acting to cut and smooth the surfaces of the cylindrical member 12 on either side of the groove 102. The air supplied to the cutter guard 62 from the motor 56, and exhausted therefrom through hose 80, carries therewith the residue of cylindrical member material resulting from such cutting. The brushes 88 engage portions of the outer surface of the cylindrical member 12 adjacent the cutter 64, and aid in presenting such residue to the flow of air in the cutter guard 62, so that such residue is transported from adjacent the cutter 64. The exhaust air, allowed to flow from the area of the cutter 64, carries such residue with it. Air supplied through auxiliary hose 86 aids in keeping residue material in the hose 82 properly moving.

Upon the completion of such cutting, handle 46 is rotated to withdraw cutter 64 from the cylindrical member 12, and valve 60 is closed to cut off the supply of air. The apparatus 10 may then be rolled away from the cylindrical member 12.

Figure 7:
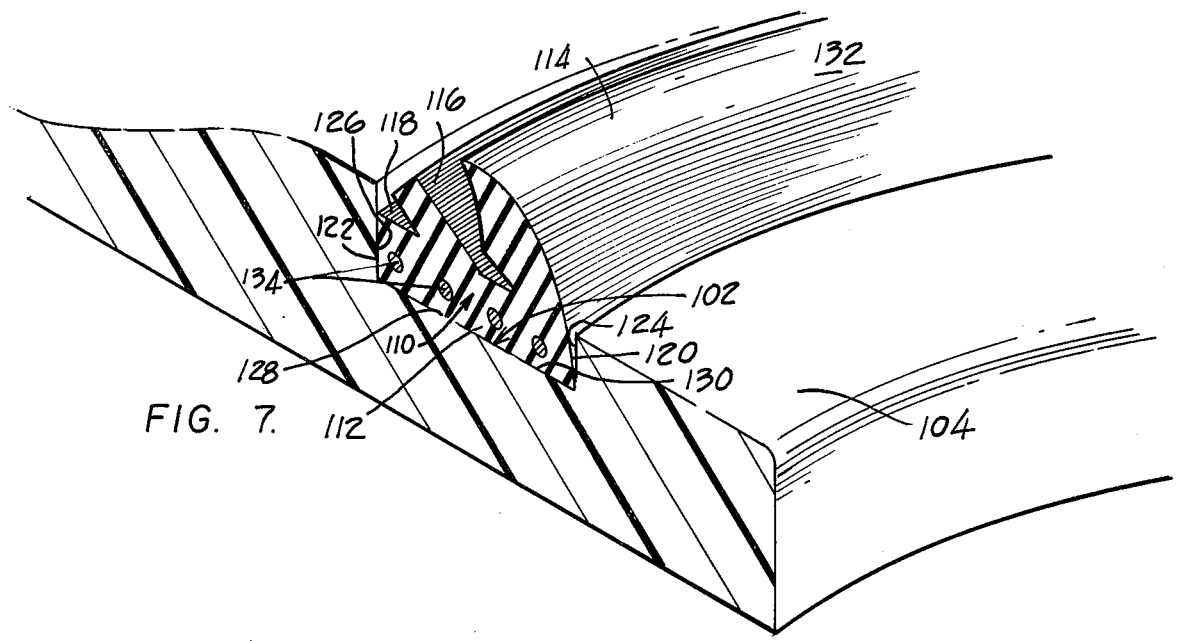
FIG. 7 is a perspective sectional view of the inner cylindrical tubular member and the seal means associated therewith.

The cylindrical member 12, upon being removed from the mandrel 14 with the groove or channel 102 formed therein, is actually a tubular member substantially as shown in FIG. 7, and the outer surface 104 of the member 12 defines adjacent one end thereof such channel 102. Such tubular member 12 may be used to transport pressurized fluid therewithin, and is shown as associated with another tubular member 106 (FIG. 6) having an inner surface 108 which is in overlying relation with the outer surface 104 of the member 12.

Figure 6:
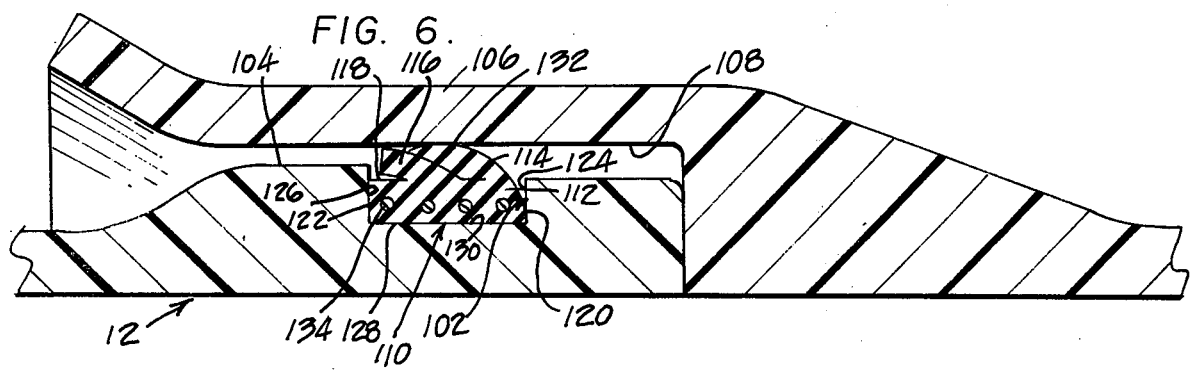
FIG. 6 is a sectional elevation of a pair of tubular members, showing the joint thereof and showing the seal means associated therewith.

A sealing apparatus 110 is shown in FIG. 6 and 7 for providing sealing relation between the outer surface 104 and the inner surface 108. The sealing apparatus 110 itself is most clearly shown in FIG. 7 and includes an elongated resilient body 112, and first and second elongated resilient ribs 114,116 formed integrally with the body 112 and extending from a side 118 thereof. Such ribs 114,116 extend from the body 112 itself and are disposed therealong, as shown. The body 112 defines opposite side surfaces 120,122 which are positioned adjacent opposite sides 124,126 of the channel 102, and a surface 128 opposite side 118, positionable against the bottom surface 130 of the channel 102. The ribs 114,116 extend from and are angled in generally the same direction relative to the body 112, and each of the ribs 114,116 overlies a portion of the body 112 in spaced relation thereto. The rib 114 defines an elongated rib surface 132 which actually extends from the side surface 120 as a smooth continuation thereof, and inwardly of such side surface 120. The body 112 has elongated substantially inextensible members 134 embedded therein and therealong to limit stretching of the sealing apparatus 110.

In the use of the sealing apparatus 110, the body 112 is seated in the channel 102, with the side surface 128 seated against the bottom 130 of the channel 102 and the side surfaces 120,122 against the sides 124,126 of the channel 102. The tubular member 106 is then brought sideways in relation to tubular member 12 to bring the inner surface 108 of the member 106 into contact with the elongated rib surface 132. Through such contact the rib 114 is angled even further relative to the body 112, and by such bending or angling, the rib 114 is brought into contact with and bends the rib 116. The resiliency of the elongated rib 114 urges the surface 132 into sealing contact with the inner surface 108, and the resiliency of the rib 116 acts on the rib 114 to in turn further tend to urge the rib surface 132 into sealing contact with the inner surface 108. Such resiliency also of course tends to seat the body 112 in the channel 102. Through such means, an extremely effective and proper seal is achieved between such members 12,106.

With the use of the apparatus 10 described above, extremely close tolerances in the sizing and cutting of the depth of a groove or channel can be achieved. The apparatus 10, it will be seen, is extremely simple and efficient in design, and effective in use. The dimensional control of the channel may be achieved so that sealing apparatus of the well-known O-ring type can be used. However, use of the sealing apparatus 110 in accordance with the above description results in the fact that such extremely high dimensional control need not be necessary.

What is claimed is:

1. Apparatus for forming an annular groove about the outer surface of a member rotatable about an axis, comprising:

base means; means adjustably positioning said base means;

cutter means comprising a rotatable cutter having a plurality of cutting edges, means rotatably mounting said cutter relative to the base means, and positionable upon positioning of the base means to engage the outer surface of the member so, that, upon rotation of said cutter, said cutting edges are in cutting engagement with the outer surface of said member; said adjustable means further including means for selectively varying the position of the cutter relative to the base means and the member toward and away from said axis about which the member is rotatable and means for selectively varying the position of the cutter relative to the base means and the member generally along said axis about which the member is rotatable, means for rotating the cutter to cut the outer surface of the member, so that upon said rotation of the member about said axis, said annular groove is cut therein about the outer surface thereof, said means for rotating the cutter comprising an air motor means drivable upon a supply of flowing air thereto, and further comprising inlet conduit means for supplying a flow of air exhausted from said air motor means adjacent to the cutter, and outlet conduit means conducting the air with the member material residue resulting from said cutting of the member away from said cutter, and brush means mounted relative to the base means and disposed around the cutter and engageable with at least a portion of the outer surface of the member adjacent the cutter serving to contain the air entering and exiting adjacent the cutter means.

2. The apparatus of claim 1 wherein the plurality of cutting edges comprise a central portion extending outwardly a greater distance than the remaining portion thereof.

* * * * *